(No Model.) 5 Sheets—Sheet 1.

W. ROBINSON.
RADIAL CAR TRUCK.

No. 524,402. Patented Aug. 14, 1894.

WITNESSES
Joseph Ashbaugh.
Irving H. Baker.

INVENTOR
William Robinson
by his atty,
Henry W. Williams (No Model.) 5 Sheets—Sheet 2.

W. ROBINSON.
RADIAL CAR TRUCK.

No. 524,402. Patented Aug. 14, 1894.

WITNESSES
Joseph Ashbaugh.
Irving H. Baker.

INVENTOR
William Robinson
by his atty,
Henry W. Williams (No Model.)  5 Sheets—Sheet 3.

W. ROBINSON.
RADIAL CAR TRUCK.

No. 524,402. Patented Aug. 14, 1894.

WITNESSES
Joseph Ashbaugh.
Irving A. Baker.

INVENTOR
William Robinson,
by his atty,
Henry W. Williams

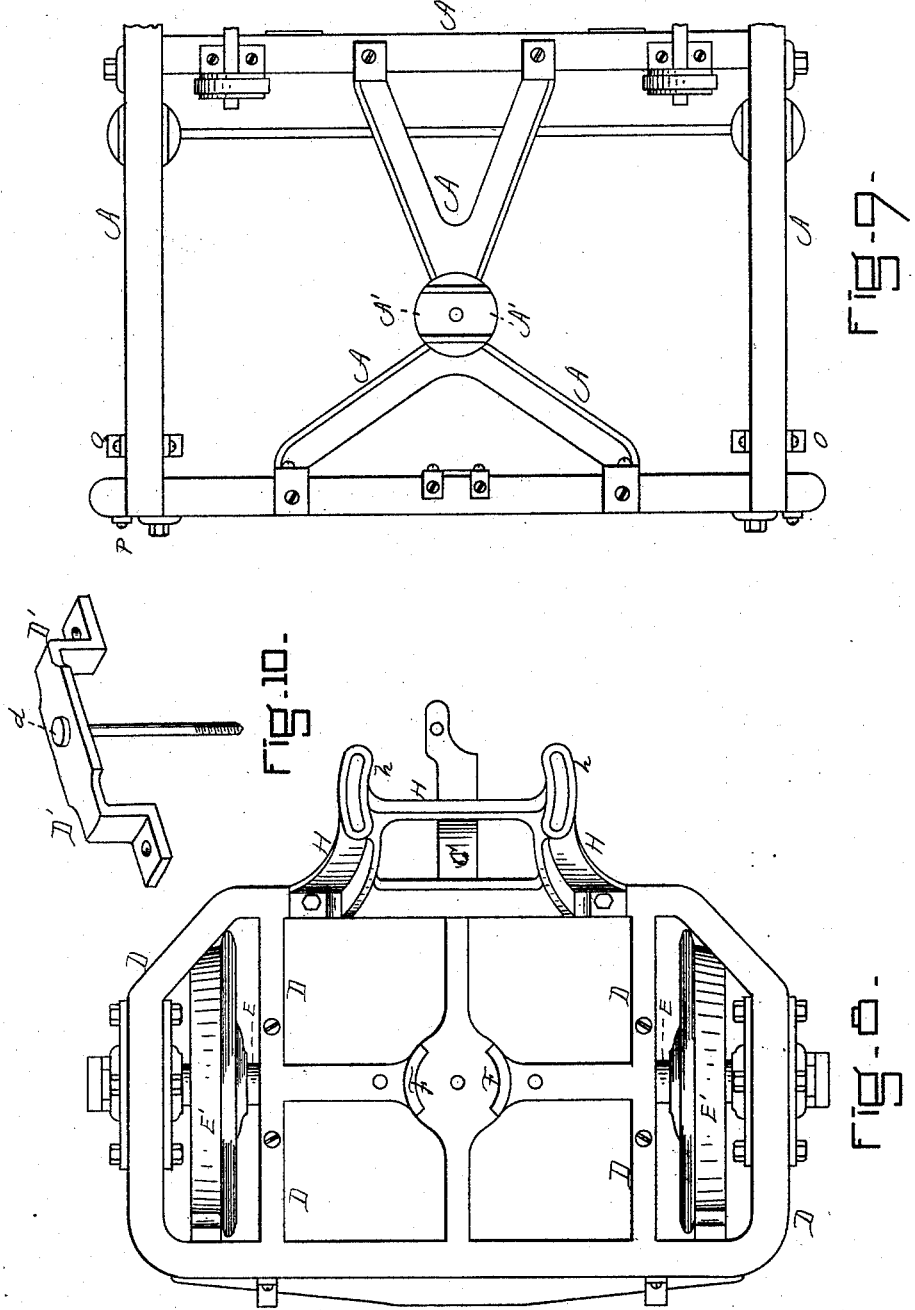

(No Model.) 5 Sheets—Sheet 5.
W. ROBINSON.
RADIAL CAR TRUCK.
No. 524,402. Patented Aug. 14, 1894.
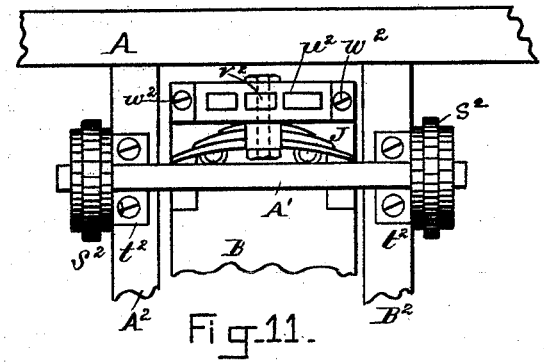
Fig. 11.
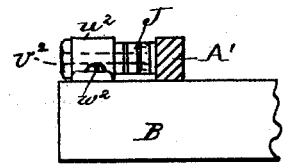
Fig. 12.
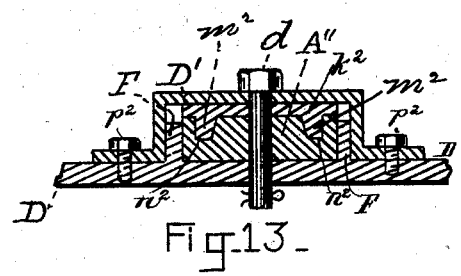
Fig. 13.
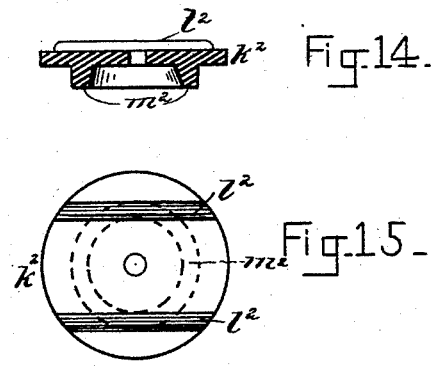
Fig. 14.
Fig. 15.
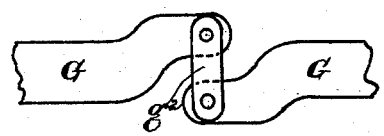
Fig. 16.
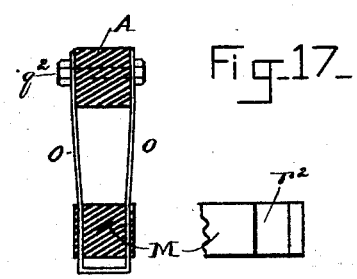
Fig. 17.
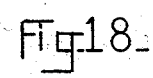
Fig. 18.
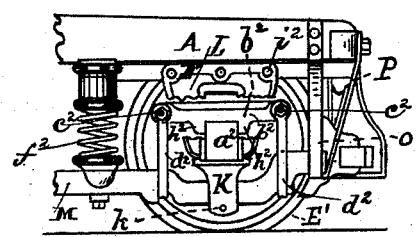
Fig. 19.
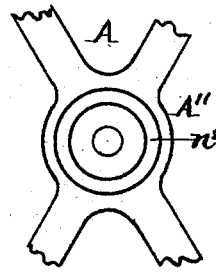
Fig. 20.
WITNESSES:
Chas. S. Goodwin.
Geo. H. Cushman.
INVENTOR:
William Robinson.

UNITED STATES PATENT OFFICE.

WILLIAM ROBINSON, OF BOSTON, MASSACHUSETTS.

RADIAL CAR-TRUCK.

SPECIFICATION forming part of Letters Patent No. 524,402, dated August 14, 1894.

Application filed May 12, 1882. Serial No. 61,154. (No model.)

*To all whom it may concern:*

Be it known that I, WILLIAM ROBINSON, a citizen of the United States, residing in Boston, in the county of Suffolk and State of Massachusetts, have invented certain new and useful Improvements in Radial Car-Trucks, of which the following is a specification.

The object of my invention is to produce a car truck in which the axles become radial to curves around which the car passes and parallel on straight lines and only on straight lines.

The nature of my invention will be understood from the description which follows, reference being had to the accompanying drawings, which form a part of this specification, in which—

Figure 1:
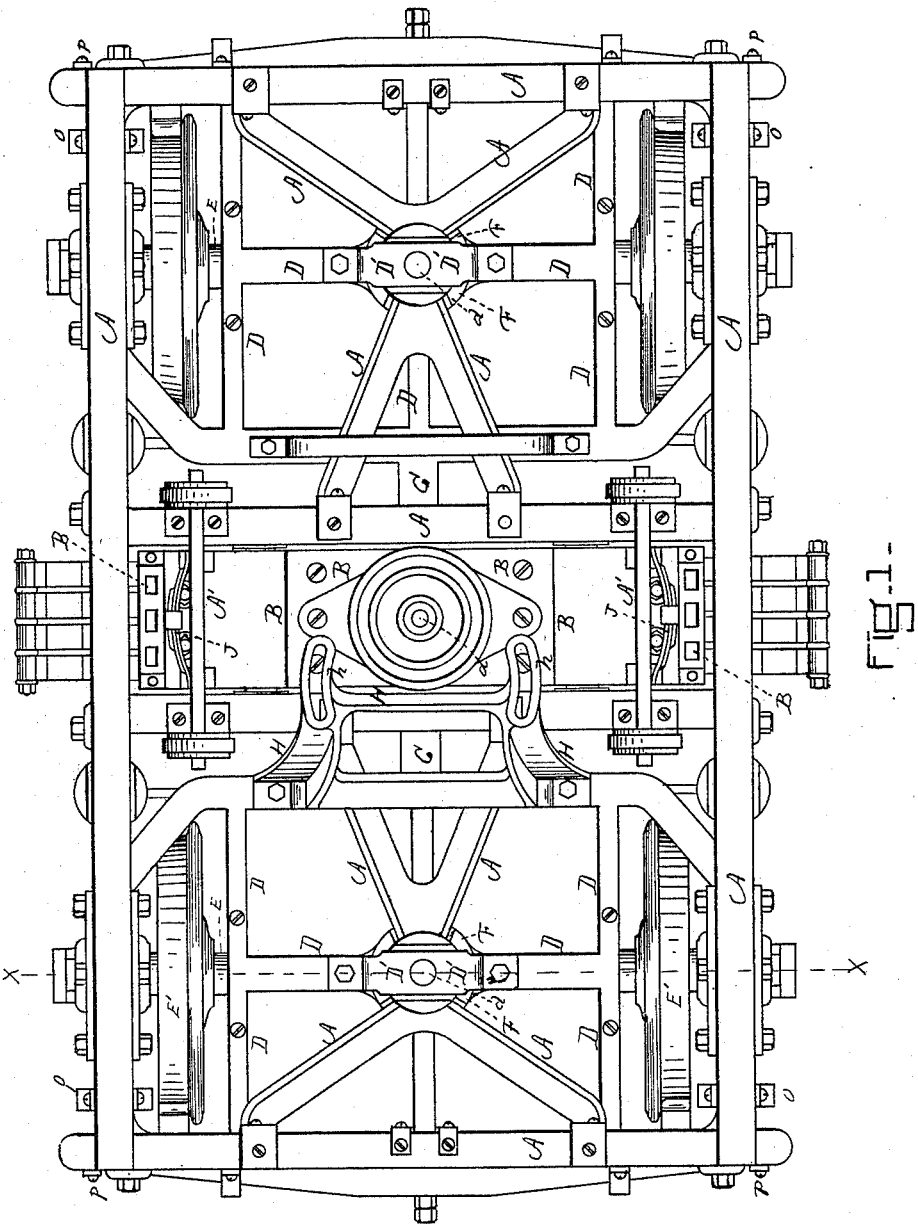
Figure 2:
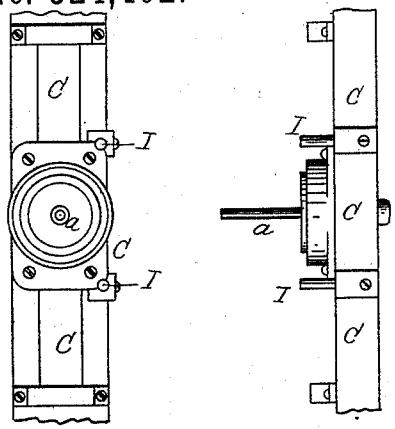
Figure 3:
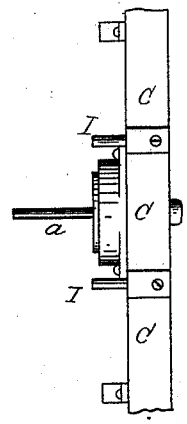
Figure 4:
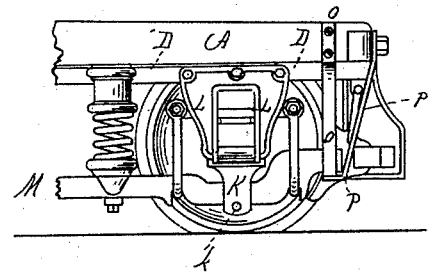
Figure 7:
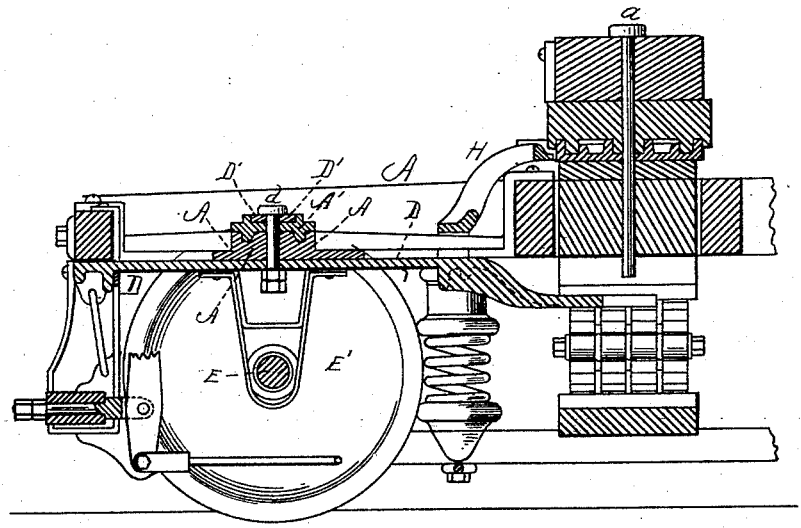
Figure 5:
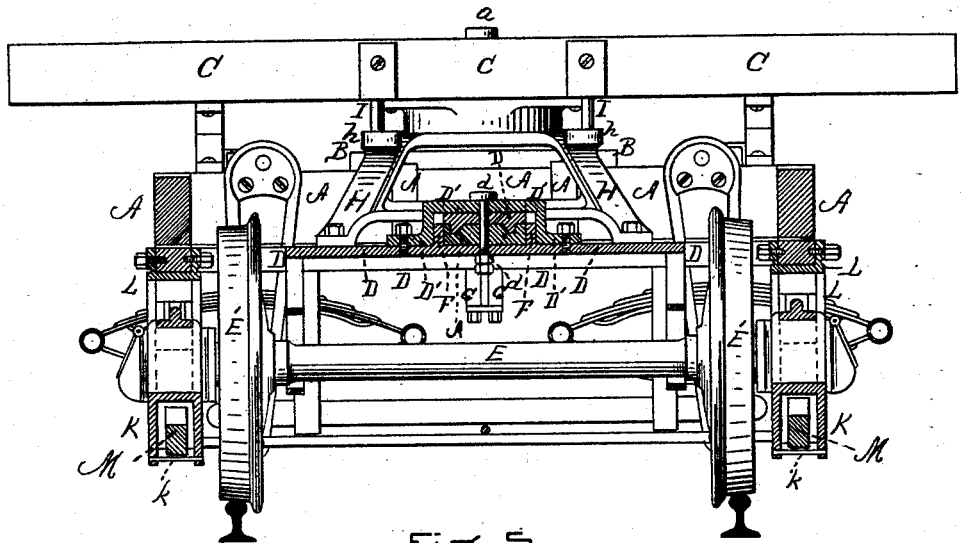
Figure 6:
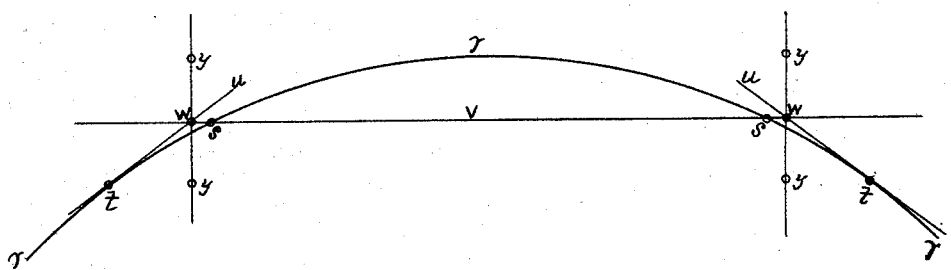

Figure 1, is a plan view of a radial car truck, embodying my invention. Fig. 2 is a bottom plan view of the body bolster, that is, the bolster forming that part of the car body on which the car truck swivels. Fig. 3 is a side elevation of the same. Fig. 4 is a side elevation of one end of the radial truck. Fig. 5 is a transverse, vertical section of the truck, on line $x, x$, Fig. 1, showing the body bolster in position. Fig. 6 is a diagrammatic plan view, showing the relative positions on the car body and truck, of the swiveling points and radiating pins. Fig. 7 is a central longitudinal section of a portion of the truck, including the body bolster. Fig. 8 is a plan view of the swiveling or radiating supplemental frame, hereinafter called the radial frame. Fig. 9 is a plan view showing one end of the main truck frame, with the bearing on which the radial frame swivels. Fig. 10 is a perspective view showing the strap and king bolt which bind the radial frame and main truck frame together in a swiveling connection. Figs. 11 and 12 are detail views showing the connection of the check spring with the swing bolster, and its bearing against an attachment of the main frame. Figs. 13, 14, 15 and 20 are detail views showing the swiveling connection of the radial frames with the main truck frame. Fig. 16 is a detail showing the connection of the two radial frames. Figs. 17 and 18 are details showing an equalizer guide and Fig. 19 is a side elevation of one end of the radial truck, partly in section.

A is the main truck frame and B the swing-bolster contained in said frame and forming a part of the main truck.

C is the body bolster, rigidly secured to, and forming a part of, the car body.

The main truck frame A is pivotally connected at $a$, through the medium of its swing-bolster B, to the body bolster C, that is, to the car body or frame, on which it swivels, all in the usual manner.

D, D, are the radial frames pivotally connected at $d$ to the main truck frame A. The pedestals L are secured by bolts $i^2$ (Fig. 19) to the radial frames D, and embrace the axle boxes in the usual manner, whereby the swiveling or radial movement of the radial frames D on the main truck frame A causes, through said pedestals L and axle boxes $a^2$, a corresponding swiveling or radial movement in the axles E journaled in said axle boxes.

The saddles $b^2$, resting loosely on the axle boxes $a^2$, are provided with downward projections or lugs $h^2$ which prevent said saddles from slipping off the boxes $a^2$. To the ends of said saddles are pivoted at $c^2$, the links or stirrups $d^2$ which support the equalizing bar M, said equalizing bar passing below the axle boxes $a^2$, as shown.

The springs $f^2$ are supported by the equalizer M, and the main truck frame A rests upon and is supported by said springs $f^2$, in the usual manner.

The main truck frame A is provided with swiveling centers or plates as shown at A″, (Fig. 20,) to which the radial frames D are pivotally connected in the following manner, (see especially Figs. 13, 14 and 15:) The swiveling center of the radial frame D is brought under the bearing plate A″ of the main frame A. The lugs F of the center bearing of the radial frame D, project upwardly close to the bearing plate A″ of the main frame, whereby lateral motion of said radial frame relatively to the main frame, is prevented. The swiveling plate $k^2$ is placed in position with its annular projection $m^2$ fitting into the annular groove $n^2$ of the bearing plate A″. The strap D′ is now passed over the swiveling plate $k^2$, between the upward projections $l^2$ of said swiveling plate, and secured firmly by bolts $p^2$ or otherwise, to the radial frame D, as shown in Figs. 1, 5, 7 and 13. The king-pin $d$ is also passed through the strap D′, swiveling plate $k^2$ and plate A″. Thus said radial frame is pivotally supported upon, and depends from, the main truck frame A. Said radial frame supports no weight, but its own weight is wholly supported by the main frame, as just described. The office of the radial frames is to keep the axles in proper position and to guide their movements relatively to the main truck frame.

One of the radial frames D is provided with the frame or bracket H rigidly secured to said radial frame. Said bracket H is provided with the two horizontally projecting arms $h$, said arms having slots curving toward each other, as shown.

The pins I, rigidly secured to the body bolster or other portion of the car body or frame, drop into and engage, the slotted arms $h$ of the radial frame. The two pins I, it will be observed, are placed on opposite sides of the longitudinal center line of the car, and in a line crossing the car body in front of the central swiveling point $a$ of the main truck on the car body.

The two radial frames are provided with brackets G, extending inwardly toward each other, and the extreme ends of these brackets are adjustably connected together by means of links $g^2$ as shown in Figs. 5 and 16. Thus when one of the radial frames is caused to swivel on the main truck frame the swiveling movement is communicated through said links $g^2$, to the other radial frame, but in a reverse direction, whereby radiation in one axle of the truck causes radiation in the other axle.

The operation of my radial truck is as follows: When a curve is reached the main truck turns on its pivot $a$ on the car body, in the usual manner; at the same time the position of the pins I relatively to the longitudinal center line of the main truck frame is changed and these pins, engaging the slotted arms $h$ of the bracket H, change the position of said arms relatively to said longitudinal center line of the main truck frame, that is, the radial frame is thus caused to turn on its swiveling center $d$ on the main truck frame A, whereby the axle of said radial frame is brought into a position radial to the curve around which the car is passing. This radial movement is communicated to the other radial frame through the brackets G and links $g^2$, as already described. The truck on the opposite end of the car is constructed in the same manner. Thus all the axles in the car are brought into a radial position on curves. When a straight track is reached the leverage of the pins I is applied in the reverse direction, to the arms $h$ of the bracket H, whereby the radial frames D are caused to swivel in a reverse direction and thus the axles are brought into their normal or parallel position.

It will be observed that when the radial frames radiate on the main truck frame, the pedestals L, the axles E and the wheels E', and saddles $b^2$ are carried to one side of their normal position relatively to the main truck frame. As said saddles are carried to one side by the lateral movement of the boxes, the upper ends of the links or stirrups $d^2$, are also carried to one side, and said stirrups are thus brought into an inclined position. Thus the weight of the main truck, and of the car body supported thereon, is suspended by means of said stirrups and saddles, from the axle boxes, while, at the same time, the axle boxes and pedestals controlled by the radial frame, are movable laterally without friction.

The pedestals L are provided with the bifurcated extensions K, the bifurcations extending downwardly on each side of the equalizing bar M, and serving as a guide and safety stop to limit the side movement of said equalizing bar. Pins $k$, passing through the lower ends of the bifurcations of the extension K and beneath the equalizing bar, will serve to hold the equalizing bar in substantially its normal position in case of breakage or other accident. Thus the extension K, secured to the axle box, becomes a guide and safety strap combined.

The guiding bar or stirrup $o$ is secured to the truck frame A by bolts $q^2$, and the sides of said stirrups closely embrace the equalizing bar M, fitting into the grooves $r^2$ near the end of said equalizer, as shown in detail in Figs. 17 and 18.

The bars P, (Fig. 4,) are secured rigidly to the ends of the main truck frame A, and, extending downwardly, have their lower ends rigidly secured to the lower ends of the guiding bars or stirrups $o$, thus serving to brace said guiding bars $o$ and preventing end movement in said equalizing bars M.

The swing bolster B is hung on swing links $s^2$ from the transom bars $A^2$, $B^2$, of the main truck frame A, in any usual or suitable manner (see Fig. 11). In the present instance the swing links $s^2$ swing on the castings $t^2$ which are supported partly by the transoms $A^2$, $B^2$, and partly by the bars A' passing across said transoms and through said castings $t^2$ as shown in Fig. 11. The bars A' are thus held firmly in place on said transoms, thus forming a rigid part or connection of the main truck frame A.

The swing bolster B, it will be observed, if allowed to swing with entire freedom, might at times swing suddenly to one side and thus cause the radial frames to swivel somewhat when such a movement was undesirable. To prevent this I provide the springs J, which are secured to the side bearing plates $u^2$ by the bolts $v^2$. Said bearing plates $u^2$ are bolted to the swing bolster B by the bolts $w^2$. The ends of the springs J, bear against the bar A', which is secured to the transoms $A^2$, $B^2$, as already described, whereby the swing of the bolster B compresses the springs J and the movement of said bolster is thereby retarded and softened without sudden shocks. This arrangement of check springs allows the free vertical movement of the swing bolster B in the usual manner, the ends of the springs moving vertically on the sides of the bars A'. Furthermore, when the bolster B swings to one side it does not compress the spring on that side of the truck toward which it swings, but on the opposite side. This is an advantage, since pressure exerted on the side of the truck toward which the car body swings tends to upset and derail the truck, whereas pressure exerted on the opposite side of the truck tends to steady it and keep it in place.

The springs J might, of course, be secured to the swing bolster in any other suitable manner, or they might be secured to the main truck frame, in which case their free ends would have a bearing against the swing bolster or an attachment to the same.

The action of the check springs tends to make a positive but elastic connection and movement between the radiating pins and the radial frames.

Having thus described my invention, what I claim as new, and desire to secure by Letters Patent, is—

1. The combination, substantially as described, of a car frame, a main truck frame, a radial frame pivotally connected to said main truck frame, and one or more radiating pins or equivalent mechanical devices secured to said car frame outside of the longitudinal center thereof, said pins or devices engaging said radial frame and guiding and controlling the swiveling movement thereof relatively to said main truck frame.

2. The combination substantially as described, of the car frame, the main truck frame, the radial frame pivotally connected to said main truck frame, arms or brackets provided with curved slots, and pins or equivalent devices adjustably engaging said slotted arms, said pins and slotted arms controlling the swiveling movement of said radial frame on said main truck frame.

3. The combination substantially as described, of the following elements: the car body, the main truck frame pivotally connected thereto, the radial frame, arms or brackets secured to said radial frame and radiating pins or devices secured on opposite sides of the longitudinal center of the car body, said radiating pins or devices engaging said arms or brackets and thus controlling the swiveling movement of said radial frame.

4. The combination, substantially as described of the car frame, the main truck frame pivotally connected thereto, the radial frame, and radiating pins or devices secured to the car body on opposite sides of the longitudinal center thereof and in a line in advance of the swiveling point of said main truck frame on said car frame, said radiating pins or devices being arranged to govern or control the swiveling movement of said radial frame on its swiveling center.

5. In combination with the swing bolster B and the main truck frame, a spring having a bearing on the upper surface of said swing bolster and against a fixed portion of said truck frame, for the purpose of retarding the swinging movement of said bolster, substantially as described.

6. The combination, with the swing bolster B and the main truck frame, of the springs J secured to the bolster and bearing inwardly against the portions A′ of said truck frame, in substantially the position shown, whereby the centrifugal force, when the car is passing over a curved track, is exerted on the inner side of the truck, that is, inside of the longitudinal center of the same, substantially as described.

7. The combination of the main truck frame A and radial frames D, provided with straps D′ or equivalent mechanical devices, whereby the weight of said radial frames rests upon and is supported by the main truck frame, substantially as described.

8. The combination with the main truck frame A, of the radial frame D, provided with the semicircular side lugs or projections F adapted to prevent undue lateral movement of said radial frame on the main truck frame, substantially as described.

9. The combination, substantially as described, of the following elements: the axle boxes, the equalizing bar supported below said axle boxes, the saddles resting on the axle boxes, the swing links connecting said saddles and equalizing bar and supporting the latter, and the pedestals or box guides provided with projections or lugs adapted to steady and limit the side movement of said equalizing bar.

10. In combination, the pedestal L provided with the bifurcated projection or extension K having a pin passing through the lower ends of said bifurcations, and the equalizing bar passing between said bifurcations and above said pin, substantially as described.

11. In combination, the strap D′, the swiveling plate engaging the same, the main truck frame A, and the radial frame D, said strap extending across said swiveling plate and straddling a portion or fixture of said main truck frame and being secured to said radial frame, substantially as and for the purpose described.

12. The combination of the end braces P with the main truck frame A, the guiding bars o and the equalizing bar M, substantially as described.

13. The combination, substantially as described, of a car frame, a main truck frame, two radial frames pivotally connected to said main truck frame and adjustably connected to each other, brackets or arms secured to one of said radial frames, and radiating pins or devices secured on opposite sides of the longitudinal center of the car body, said radiating pins or devices engaging said arms or brackets secured to said radial frame, and thereby controlling and governing the swiveling movement of said radial frame.

WILLIAM ROBINSON.

Witnesses:
HENRY W. WILLIAMS,
JOSEPH ISHBAUGH.